T862020

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1010

793,188

DETERGENT COMPOSITION AND METHOD OF USING THE SAME

Paul Sosis, 14—01 Hopper Ave., Fairlawn, N.J. 07410, and Joseph G. Conte, 20 Saddlewood Drive, Parsippany, N.J. 07054

Filed Jan. 22, 1969. Published May 27, 1969

Int. Cl. C11d *1/14, 3/04*

U.S. Cl. 252—161

No Drawing. 9 Pages Specification

Incorporation of at least 25 parts per million of a divalent heavy metal ion into heavy duty detergent compositions formulated from mixtures of alkali metal straight-chain primary alkyl sulfates, alkali metal linear alkyl aryl sulfonates and detergency builders produces a detergent composition exhibiting low foam characteristics which also possesses excellent soil removal properties. The divalent heavy metal ions are preferably in the form of the alkaline earth metal halide salts.